(12) United States Patent
Sato et al.

(10) Patent No.: US 6,213,445 B1
(45) Date of Patent: Apr. 10, 2001

(54) SOLENOID VALVE WITH MAGNETIC FLUID DAMPER

(75) Inventors: Hideharu Sato; Masayuki Hangai, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/413,886

(22) Filed: Oct. 7, 1999

(30) Foreign Application Priority Data

Oct. 30, 1998 (JP) .................................................. 10-310666
Oct. 30, 1998 (JP) .................................................. 10-310667

(51) Int. Cl.[7] .................................................. F16K 31/08
(52) U.S. Cl. .................. 251/48; 251/65; 251/129.07; 251/129.15; 137/909
(58) Field of Search .................................. 251/54, 48, 65, 251/129.07, 129.15, 129.01; 335/277, 257; 137/909

(56) References Cited

U.S. PATENT DOCUMENTS

| | | | |
|---|---|---|---|
| 4,852,853 | * | 8/1989 | Toshio et al. .................... 251/129.07 |
| 5,452,745 | * | 9/1995 | Kordonsky et al. .................. 137/807 |
| 5,517,096 | * | 5/1996 | Shtarkman et al. .................. 318/434 |
| 5,955,934 | * | 9/1999 | Raj ....................................... 335/277 |
| 6,019,201 | * | 2/2000 | Gordaninejad et al. .......... 188/267.1 |
| 6,095,486 | * | 8/2000 | Ivers et al. ...................... 251/129.01 |

* cited by examiner

Primary Examiner—Kevin Shaver
Assistant Examiner—Eric Keasel
(74) Attorney, Agent, or Firm—Oblon, Spivak, McClelland, Maier & Neustadt, P.C.

(57) ABSTRACT

A gap part is formed between a magnetic plate and a moving core in a solenoid part, a magnetic fluid whose viscosity is increased by the influence of the magnetic force is filled in the gap part, the viscosity of the magnetic fluid is increased by the influence of the magnetic force when the solenoid is energized, and the speed of a moving core to be attracted by a fixed core is reduced.

6 Claims, 2 Drawing Sheets

SOLENOID VALVE WITH MAGNETIC FLUID DAMPER

INDUSTRIAL FIELD

The present invention relates to a solenoid valve to open/close a valve member by a solenoid.

DESCRIPTION OF THE RELATED ART

In a solenoid valve to open/close a valve member by a solenoid, the valve member is generally mounted on a moving core, and when a coil is energized, the moving core is attracted to a fixed core to drive the valve member, and when the coil is de-energized, the moving core is separated from the fixed core by the force of a return spring to return the valve member, and a flow passage is opened/closed thereby.

In such a solenoid valve, when the moving core is attracted to the fixed core, both cores are strongly collided with each other at high speed to generate large collision noise. There is another problem that attraction surfaces are easily worn by repeating the collision of both cores. In particular, the solenoid valve with large collision noise can not be used in an equipment to be used in a silent environment such as medical facilities.

The above-described moving core is generally inserted in a core holes provided in a coil of the solenoid in a slidable manner, and is magnetically coupled with a magnetic frame by piercing a center hole in a metallic magnetic plate forming a part of the magnetic frame arranged to surround the coil at a tip part of the core hole. Because the moving core pierces the center hole keeping a small gap therebetween, the gap becomes the gap of the magnetic passage to increase the magnetic resistance, the efficiency of the solenoid is degraded, and the power consumption is increased. Thus, to increase the efficiency of the solenoid and to save the power, it is effective to reduce the magnetic resistance. In addition, when the moving core pierces the center hole in an eccentric condition, the moving core is attracted by the magnetic plate and brought into contact therewith, and may cause the sliding, and in such a case, the moving core is subjected to the interference at a contact part with the magnetic plate to make its operation unstable.

DISCLOSURE OF THE INVENTION

A main technical problem of the present invention is to reduce the collision noise in the attraction, and to prevent the wear of an attraction surface of both cores by suppressing the speed at which a moving core is attracted by a fixed core in a solenoid valve to open/close a valve member by a solenoid.

Another technical problem of the present invention is to increase the efficiency of the solenoid and to save the power by reducing the magnetic resistance caused by the gap between the moving core and a magnetic plate in the solenoid valve.

Still another technical problem of the present invention is to prevent the mutual friction, and to stabilize the operation of the moving core by eliminating a contact part of the moving core with the magnetic plate in the solenoid valve.

In order to solve the above-described problems, the solenoid valve of the present invention is characterized in that a gap part is formed between a core hole in the solenoid part and the moving core, and a magnetic fluid whose viscosity is increased when the magnetic force is applied is accommodated in the gap part so that the magnetic fluid is subjected to the influence of the magnetic force when the moving core is attracted to the fixed core by the energization to a coil.

In the solenoid valve of the above-described construction, when the coil is energized, the moving core is attracted to the fixed core to drive the valve member, and when the coil is de-energized, the moving core is separated from the fixed core to return the valve member, and because the viscosity of the magnetic fluid is rapidly increased by the magnetic field excited by the coil during the energization, the attraction speed of the moving core to the fixed core is reduced. Thus, the strong collision with the fixed core is prevented, the collision noise is reduced, and the wear of both attraction surfaces is prevented.

In the present invention, the gap part is preferably formed between the magnetic plate forming a part of a magnetic frame and the moving core, and the magnetic fluid is filled in the gap space.

No magnetic gap is thus present between the moving core and the magnetic plate, and the magnetic resistance can be reduced. Further, by substantially and uniformly surrounding the whole periphery of the moving core with the magnetic fluid, the moving core is prevented from sliding with the magnetic plate through the partial contact with each other, and the operation of the moving core can be stabilized.

In the present invention, a magnetic unit to maintain the magnetic fluid in the gap part by the magnetic force can be provided. The magnetic unit includes a permanent magnet as an example, and the permanent magnet is provided on each end of the magnetic plate across moving core. As another example of the magnetic unit, the remanent magnetism of the magnetic plate and/or the moving core can be used. In such a case, at least one of the magnetic plate and the moving core is formed of a hard or semi-hard ferromagnetic material. The permanent magnet can be used together with the remanent magnetism.

In one specific embodiment of the present invention, a communication hole to balance the air pressure to be applied to each end of the moving core by communicating both end parts of the moving core with each other, is provided at the position not to be directly intersected with the gap part in which the magnetic fluid is accommodated.

DETAILED DESCRIPTION

Figure 1:
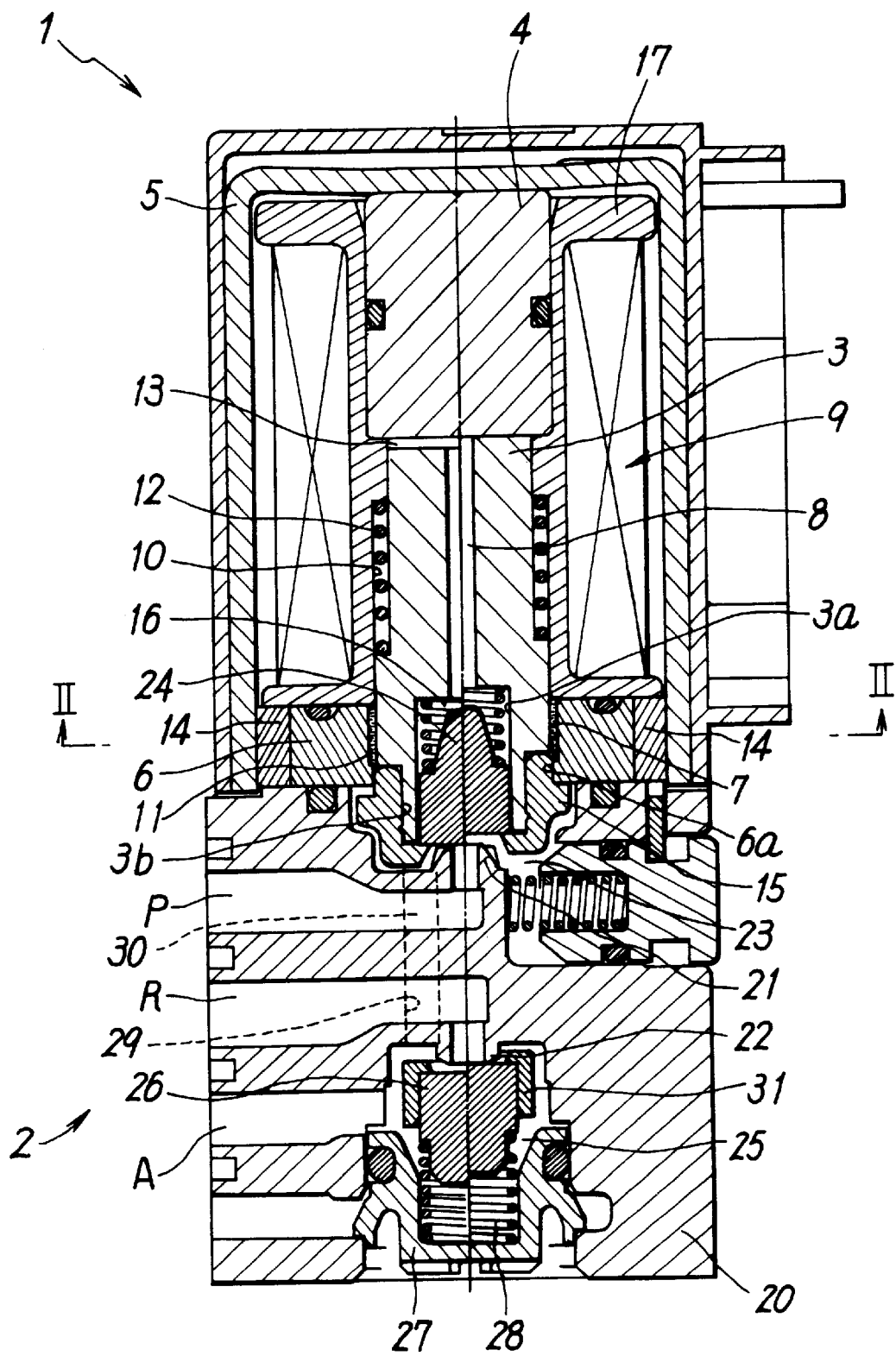
FIG. 1 is a longitudinal sectional view of an embodiment of a solenoid valve of the present invention, where the right half section illustrates the longitudinal sectional view when a coil is energized, and the left half section illustrate the longitudinal sectional view when the coil is not energized.
Figure 2:
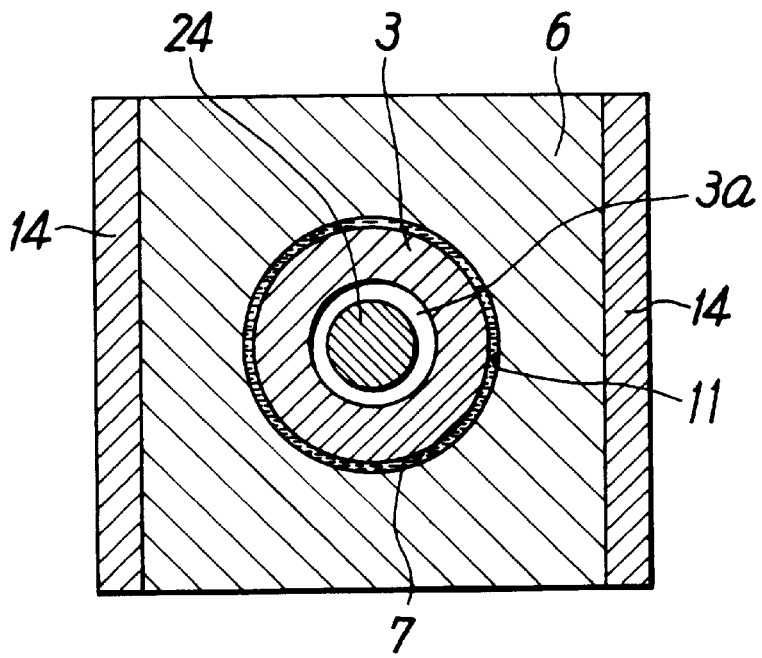
FIG. 2 is an expanded sectional view of a major part taken along the line II—II of FIG. 1.

FIG. 1 illustrates one embodiment of a solenoid valve of the present invention, and the solenoid valve of the embodiment comprises a main valve part 2 to switch a fluid flow passage by a valve member, and a solenoid 1 to open/close the valve member through the energization to a coil 9.

The main valve part 2 is provided with a valve body 20, and the valve body 20 is provided with an input port P to be connected to a feed source of compressed air, an output port A to be connected to an actuator such as an air cylinder, and a discharge port R to discharge the air outside.

A feed valve seat 21 is arranged in a flow passage to connect the input port P to the output port A through a communication hole 29 inside the valve body 20, and a discharge valve seat 22 is arranged in a flow passage to connect the output port A to the discharge port R so that they are opposite to each other on the same axis.

A feed valve member 24 to open/close the feed valve seat 21 is arranged in a feed valve chest 23 in which the feed valve seat 21 is opened in a condition where the feed valve member is held by a moving core 3 of the solenoid 1. In addition, a discharge valve member 26 to open/close the discharge valve seat 22 is arranged in a discharge valve chest 25 in which the discharge valve seat 22 is opened in a condition where the discharge valve member is urged in a direction to close the discharge valve seat 22 by a valve spring 28 which is provided in a compressed condition between a spring seat 27 and the discharge valve member.

A push rod 30 is inserted in the communication hole 29 so as not to prevent the flow of the compressed air. A lower end of the push rod 30 is abutted on an upper surface of a cap-like pressing member 31 mounted on the discharge valve member 26, while an upper end of the push rod 30 is abutted on a lower surface of a cap 15 mounted on a lower end of the variable core 3 in the solenoid 1.

The push rod 30 is pushed down by the moving core 3 when the moving core 3 is lowered and the feed valve member 24 closes the feed valve seat 21, and pushes down the discharge valve member 26 to release the discharge valve seat 22. On the other hand, when the moving core 3 is elevated and the feed valve member 24 releases the feed valve seat 21, the push rod is pushed up by the urging of the valve spring 28 by releasing the pressure of the discharge valve member 26, and the discharge valve seat 22 is closed by the discharge valve member 26.

The solenoid 1 is provided with the coil 9 formed by winding a conductive wire around a bobbin 17, a magnetic frame 5 to surround the coil 9, a core hole 10 formed at the center of the bobbin 17, a fixed core 4 which is fixed to one end side of the core hole 10 in an airtight manner and magnetically coupled with the magnetic frame through the contact with the magnetic frame 5, the moving core 3 which is slidably inserted in the other side of the core hole 10, and a return spring 12 to urge the moving core 3 in a direction away from the fixed core 4. The core hole 10 comprises a center hole in the bobbin 17, and a center hole 6a in a magnetic plate 6 which forms a part of the magnetic frame 5 connected thereto, and the moving core 3 is provided so that its tip is projected in the feed valve chest 23 through the center hole 6a in the magnetic plate 6.

The moving core 3 is provided with a recess 3a in a lower end face, and the feed valve member 24 and a valve spring 16 to urge the feed valve member 24 in a projecting direction from the recess 3a are accommodated in the recess 3a. In order to prevent the feed valve member 24 from being projected from the recess 3a, the cap 15 formed of an elastic material such as a synthetic resin is mounted on a small diameter part 3b of a lower end part of the moving core 3.

A communication hole 8 to flow the compressed air in/out of a space 13 between the moving core 3 and the fixed core 4 is provided in a center part of the moving core 3. The communication hole 8 is provided so that the moving core 3 is not affected by the air pressure by balancing the air pressure to be applied on each end of the moving core by flowing the compressed air in/out of the space 13 while the moving core 3 is in operation.

A gap part 11 of the uniform size surrounding the periphery of the moving core 3 is formed between the magnetic plate 66 and the moving core 3 in the center hole 6a of the magnetic plate 66, and a magnetic fluid 7 is accommodated in the gap part 11. The magnetic fluid 7 is obtained by mixing iron powders in, for example, an oil or other fluid, and its viscosity is rapidly increased by the influence of the magnetic field. The magnetic fluid 7 is subjected to the influence of the magnetic force through the magnetic plate 6 when the magnetic frame 5 and the fixed core 4 are excited by the energization to the coil 9 and the moving core 3 is attracted to the fixed core 4, and the viscosity is increased to drop the attraction speed of the moving core 3.

When the coil 9 is de-energized, and the magnetic frame 5 and the fixed core 4 are demagnetized, the moving core 3 is separated from the fixed core 4 by the force of the return spring 12, and because the no magnetic force is applied to the magnetic fluid 7, the increased viscosity is dropped to smoothly return the moving core 3.

To prevent the leakage of the magnetic fluid 7 from the gap part 11, an appropriate magnetic unit is preferably provided. A permanent magnet 14 mounted on each side end of the magnetic plate 6 across the moving core 3 is shown in the embodiment illustrated as an example of the magnetic unit. The magnetic fluid 7 is surely maintained in the gap part 11 by the action of the magnetic force from the permanent magnet 14 and the surface tension of the fluid itself by mounting the permanent magnet 14 on the magnetic plate 6. Thus, a seal mechanism to prevent the leakage of the magnetic fluid 7 need not be specially provided, but the seal mechanism may be added according to the condition of a place to form the gap part 11 or the viscosity of the magnetic fluid 7, and further, the seal mechanism together with the magnetic unit may be provided.

The magnetic force of the permanent magnet 14 is naturally of the magnitude so that the operation of the solenoid 1 is not adversely affected.

In the solenoid valve having the above-described construction, when the coil 9 is not energized, the moving core 3 is lowered as illustrated in the left half part in FIG. 1, the feed valve member 24 closes the feed valve seat 21 by the urging force of the valve spring 16, and the discharge valve member 21 pressed by the pressing member 31 opens the discharge valve seat 22 to communicate the output port A with the discharge port R.

When the coil 9 is energized, the moving core 3 is attracted to the fixed core 4 against the urging force of the return spring 12 as illustrated in the right half part in FIG. 1, the feed valve member 24 opens the feed valve seat 21, and the discharge valve member 26 closes the discharge valve seat 22 by the urging force of the valve spring 28 to communicate the input port P with the output port A.

Because the magnetic fluid 7 is filled in the gap part 11 between the magnetic plate 6 and the moving core 3, the viscosity of the magnetic fluid 7 is rapidly increased by the influence of the magnetic force when the coil 9 is energized, and the attraction speed of the moving core 3 to the fixed core 4 is reduced. Thus, the moving core 3 is prevented from being strongly collided with the fixed core 4, the collision noise is reduced, and at the same time, the wear of an attraction surface of each core is prevented.

Thus, the solenoid valve of this construction is suitable for a mechanical appliance to be used in a silent environment such as medial facilities.

Further, because the magnetic fluid 7 is interposed in the gap between the moving core 3 and the magnetic plate 6, no magnetic gap is present between the moving core 3 and the magnetic plate 6 to reduce the magnetic resistance, and the efficiency of the solenoid is increased to save the power. Still further, the magnetic fluid 7 is substantially and uniformly maintained around the whole periphery of the moving core 3, the moving core 3 is prevented from being brought into slidable contact with the magnetic plate 6 due to the mutual attraction, and the mutual friction is prevented, and the operation of the moving core becomes stable.

In addition, because the communication hole 8 to flow the compressed air in/out of the space between the moving core 3 and the fixed core 4 is provided in the center of the moving core 3, and is not directly intersected with the gap part 11, no force is applied to the magnetic fluid 7 by the flow of the compressed air, and the magnetic fluid 7 is stably maintained between the moving core 3 and the magnetic plate 6.

In the above-described embodiment, the permanent magnet 14 is used as the magnetic unit to maintain the magnetic fluid 7 in the gap part 11, but in place of the permanent magnet 14, at least one of the magnetic plate 6 and the moving core 3 is formed of a hard or semi-hard ferromagnetic material, and its remanent magnetism can be used as the magnetic unit. Alternatively, such a remanent magnetism may be used together with the permanent magnet.

The position at which the gap part 11 is provided is not limited in the center hole 6a in the magnetic plate 6, but may be other position of the core hole 10. In short, the magnetic fluid 7 is only accommodated in the gap part 11 formed around the moving core 3 so that the moving core 3 is subjected to the influence of the magnetic force when it is attracted by the fixed core 4 due to the energization to the coil 9.

Figure 3:
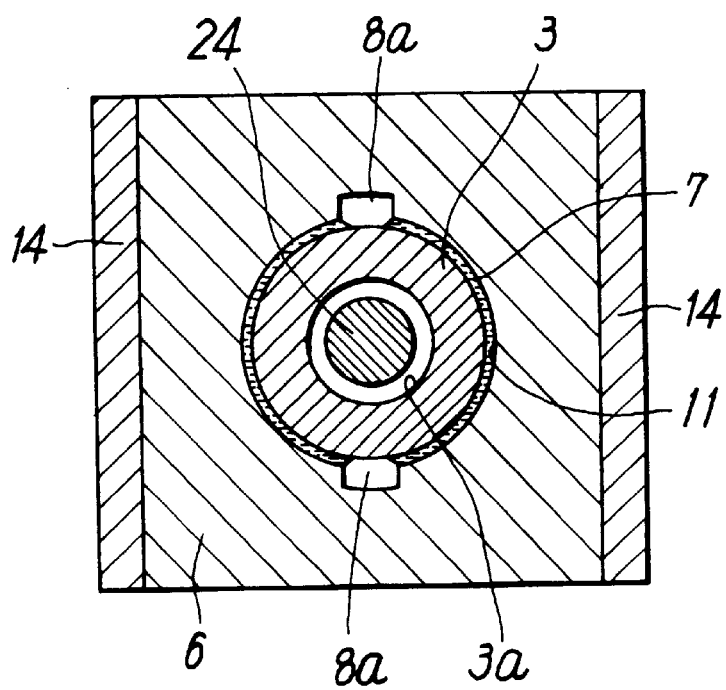
FIG. 3 is an expanded sectional view of a major part taken at a similar position to that of FIG. 2, of a second embodiment of the present invention.

FIG. 3 shows the second embodiment of the present invention, and the second embodiment is different from the first embodiment in that the communication hole 8 to balance the force by the air pressure at each end of the moving core 3 is formed in the center part of the moving core 3 in the first embodiment, while a plurality of communication holes 8a are formed in an inner wall of the core hole 10 or in an outer surface of the moving core 3 in the second embodiment. The communication holes 8a can be intersected with the gap part 11 in which the magnetic fluid 7 is accommodated, and when it is intersected, the magnetic unit effectively functions because the magnetic fluid 7 is prevented from flowing out of the gap part 11 through the communication holes 8a.

Other constructions than the above-described construction of the second embodiment are substantially same as those of the first embodiment, and the description is omitted.

A three-port valve is used in each of the above-described embodiments, but the solenoid valve of the present invention is not limited thereto, but any valves having a plurality of ports including a two-port valve, a four-port valve or a five-port valve may be used.

As described above in detail, in the solenoid valve of the present invention, the magnetic fluid is accommodated in the gap part formed around the moving core, and the viscosity of the magnetic fluid is increased by the influence of the magnetic force when the solenoid is energized, the speed at which the moving core is attracted to the fixed core is reduced, both cores are prevented from being strongly collided with each other, the collision noise is reduced, and the wear of each attraction surface is prevented.

Because the magnetic fluid is interposed between the moving core and the magnetic plate, no magnetic gap is present between the moving core and the magnetic plate, the magnetic resistance is reduced, and the efficiency of the solenoid is increased to save the power. In addition, the magnetic fluid is substantially and uniformly maintained around the whole periphery of the moving core, the moving core is prevented from being brought into slidable contact with the magnetic plate due to the mutual attraction, the mutual friction is prevented, and the operation of the moving core becomes stable.

What is claimed is:

1. A solenoid valve comprising:
   a plurality of ports;
   a valve seat provided in a flow passage and configured to connect the ports to each other;
   a valve member configured to open/close said valve seat; and
   a solenoid part configured to actuate said valve member, wherein said solenoid part comprises:
   a coil wound around a core hole,
   a magnetic frame configured to surround said coil and having a magnetic plate with a center hole thereon,
   a fixed core fixed to one side of said core hole in an airtight manner and magnetically coupled with said magnetic frame, and
   a moving core slidably inserted in a side of said core hole opposing said one side, and magnetically coupled with said magnetic frame by penetrating said center hole in said magnetic plate, wherein said valve member is coupled with a tip of said moving core a gap is formed between said center hole and moving core, and
   a magnetic fluid having a viscosity which is increased when a magnetic force is applied thereto is accommodated in only the gap so that the magnetic fluid is subjected to the influence of the magnetic force when the moving core is attracted to the fixed core through energization of said coil.

2. A solenoid valve according to claim 1, further comprising a communication hole configured to balance air pressure applied to each end of said moving core by communicating both ends of said moving core with each other, wherein the communication hole is provided at a position not directly intersected with said gap in which the magnetic fluid is accommodated.

3. A solenoid valve according to claim 1, further comprising a magnetic unit configured to maintain said magnetic fluid in said gap with a magnetic force of said magnetic unit.

4. A solenoid valve according to claim 3, wherein at least one of said magnetic plate and said moving core is formed of a hard or semi-hard ferromagnetic material to thereby provide said magnetic unit having a remanent magnetism.

5. A solenoid valve according to claim 3, wherein said magnetic unit is a permanent magnet provided adjacent to the center hole of the magnetic plate.

6. A solenoid valve according to claim 5, wherein at least one of said magnetic plate and said moving core is formed of a hard or semi-hard ferromagnetic material to thereby provide a remanent magnetism which works together with said permanent magnet to provide said magnetic unit.

* * * * *